United States Patent
Liu et al.

(10) Patent No.: US 9,800,417 B2
(45) Date of Patent: *Oct. 24, 2017

(54) SECURE NEIGHBOR DISCOVERY (SEND) USING PRE-SHARED KEY

(71) Applicant: DELL SOFTWARE INC., Round Rock, TX (US)

(72) Inventors: Yun Feng Liu, Shanghai (CN); Zhong Chen, Fremont, CA (US); Eric Xiang, Shanghai (CN); Yanjun Yang, Shanghai (CN)

(73) Assignee: SonicWall Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,573

(22) Filed: Jan. 3, 2017

(65) Prior Publication Data

US 2017/0118027 A1    Apr. 27, 2017

Related U.S. Application Data

(63) Continuation of application No. 14/587,947, filed on Dec. 31, 2014, now Pat. No. 9,537,872.

(51) Int. Cl.
| | |
|---|---|
| *H04L 29/06* | (2006.01) |
| *H04L 9/32* | (2006.01) |
| *H04L 9/06* | (2006.01) |
| *H04L 9/14* | (2006.01) |
| *H04L 12/24* | (2006.01) |

(52) U.S. Cl.
CPC .......... *H04L 9/3247* (2013.01); *H04L 9/0643* (2013.01); *H04L 9/14* (2013.01); *H04L 9/3239* (2013.01); *H04L 9/3242* (2013.01); *H04L 41/12* (2013.01)

(58) Field of Classification Search
CPC ........................................ H04L 41/12
See application file for complete search history.

(56) References Cited

U.S. PATENT DOCUMENTS

| | | | |
|---|---|---|---|
| 6,981,141 B1 * | 12/2005 | Mahne | G06F 21/80 713/165 |
| 7,023,997 B1 * | 4/2006 | Schier | H04L 9/16 380/277 |
| 8,307,422 B2 | 11/2012 | Varadhan | |

(Continued)

FOREIGN PATENT DOCUMENTS

WO    WO 2015/175007    11/2015

OTHER PUBLICATIONS

Dierks et al.; "The TLS Protocol Version 1.0", Jan. 1999, pp. 31-35, obtained from https://www.ietf.org/rfc/rfc2246.txt.

(Continued)

*Primary Examiner* — Ali Shayanfar
(74) *Attorney, Agent, or Firm* — Polsinelli LLP

(57) ABSTRACT

An extension is provided to the SEND protocol without requiring a CGA or third party trust anchor. A shared key is provided to both a sender and receiver of a neighbor discovery (ND) message. A digital signature option is contained in the ND message. A digital signature field is determined by the algorithm field in the option. When the ND message is received, the receiver may verify the digital signature field using the pre-shared key according to the algorithm field. If the ND message passes verification, the receiver may process the message.

20 Claims, 5 Drawing Sheets

(56) References Cited

U.S. PATENT DOCUMENTS

| | | | |
|---|---|---|---|
| 8,316,435 B1 | 11/2012 | Varadhan | |
| 8,369,334 B2 | 2/2013 | Yu | |
| 8,713,627 B2 | 4/2014 | Varadhan et al. | |
| 8,724,633 B2 | 5/2014 | Yu | |
| 8,730,844 B2* | 5/2014 | Johnson | H04W 4/006 370/255 |
| 8,782,408 B2* | 7/2014 | Fielder | H04L 9/0838 370/338 |
| 8,856,869 B1 | 10/2014 | Brinskelle | |
| 8,934,625 B2* | 1/2015 | Fielder | H04L 9/12 380/42 |
| 9,020,149 B1* | 4/2015 | Golwalkar | H04L 9/0897 380/255 |
| 9,107,048 B2* | 8/2015 | Haddad | H04W 8/082 |
| 9,237,129 B2 | 1/2016 | Ling | |
| 9,503,425 B2 | 11/2016 | Ling | |
| 9,537,872 B2 | 1/2017 | Liu | |
| 2004/0034771 A1* | 2/2004 | Edgett | G06F 21/31 713/168 |
| 2004/0196979 A1* | 10/2004 | Cheng | H04W 12/02 380/270 |
| 2004/0240669 A1* | 12/2004 | Kempf | H04L 29/12009 380/277 |
| 2006/0077908 A1* | 4/2006 | Park | H04L 29/12216 370/254 |
| 2006/0190612 A1 | 8/2006 | Kahol et al. | |
| 2007/0011734 A1 | 1/2007 | Balakrishnan et al. | |
| 2007/0211892 A1* | 9/2007 | Ohkoshi | H04L 9/14 380/30 |
| 2007/0245401 A1 | 10/2007 | Brabson et al. | |
| 2008/0120236 A1 | 5/2008 | Faith et al. | |
| 2008/0181403 A1 | 7/2008 | Sakamoto | |
| 2008/0263353 A1 | 10/2008 | Droms et al. | |
| 2008/0320582 A1 | 12/2008 | Chen et al. | |
| 2009/0025077 A1 | 1/2009 | Trojanowski | |
| 2009/0119407 A1 | 5/2009 | Krishnan | |
| 2009/0204691 A1 | 8/2009 | Xia et al. | |
| 2010/0172257 A1 | 7/2010 | Yu | |
| 2010/0175123 A1 | 7/2010 | Karino et al. | |
| 2010/0202345 A1* | 8/2010 | Jing | H04L 12/2832 370/328 |
| 2010/0299529 A1 | 11/2010 | Fielder | |
| 2010/0318784 A1 | 12/2010 | Rao et al. | |
| 2011/0055572 A1 | 3/2011 | Vogt et al. | |
| 2011/0161661 A1 | 6/2011 | Medvinsky et al. | |
| 2011/0255445 A1* | 10/2011 | Johnson | H04W 4/006 370/255 |
| 2012/0005480 A1 | 1/2012 | Batke et al. | |
| 2013/0163426 A1 | 6/2013 | Beliveau et al. | |
| 2013/0276092 A1 | 10/2013 | Sun et al. | |
| 2013/0343295 A1 | 12/2013 | Deo | |
| 2014/0013324 A1 | 1/2014 | Zhang et al. | |
| 2014/0082204 A1 | 3/2014 | Shankar et al. | |
| 2014/0115120 A1 | 4/2014 | Li et al. | |
| 2015/0334090 A1 | 11/2015 | Ling | |
| 2016/0094518 A1 | 3/2016 | Ling | |
| 2016/0119287 A1 | 4/2016 | Khazan et al. | |
| 2016/0127317 A1 | 5/2016 | Ardeli et al. | |
| 2016/0191543 A1 | 6/2016 | Liu | |
| 2016/0219018 A1 | 7/2016 | Raman | |
| 2017/0142070 A1 | 5/2017 | Ling | |

OTHER PUBLICATIONS

PCT Application No. PCT/US2014/045312 International Search Report and Written Opinion mailed Nov. 7, 2014.

U.S. Appl. No. 14/606,451 Office Action mailed Jan. 30, 2017.

U.S. Appl. No. 14/587,947 Final Office Action mailed Apr. 28, 2016.

U.S. Appl. No. 14/587,947 Office Action mailed Jan. 6, 2016.

U.S. Appl. No. 15/358,928 Office Action dated May 19, 2017.

* cited by examiner

200

| Algorithm Field | Digital Signature Field |
|---|---|
| 0 | MD5 (K\|m) |
| 1 | SHA1 (K\|m) |
| 2 | SHA256 (K\|m) |
| 3 | SHA512 (K\|m) |
| 4 | HMAC-MD5 (K\|m) |
| 5 | HMAC-SHA1 (K\|m) |
| 6 | HMAC-SHA256 (K\|m) |
| 7 | HMAC-SHA512 (K\|m) |
| 8-255 | Reserved |

SECURE NEIGHBOR DISCOVERY (SEND) USING PRE-SHARED KEY

CROSS-REFERENCE TO RELATED APPLICATIONS

This application is a continuation and claims the priority benefit of U.S. patent application Ser. No. 14/587,947 filed Dec. 31, 2014, now U.S. Pat. No. 9,537,872 issued on Jan. 3, 2017, the disclosure of which is incorporated herein by reference.

BACKGROUND OF THE INVENTION

1. Field of the Invention

The present disclosure relates generally to information handling systems, and more particularly to systems and methods for secure neighbor discovery (SEND).

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Secure neighbor discovery (SEND) protocol is a security extension of neighbor discovery protocol (NDP) in IPv6 defined in RFC 2971. NDP allows for discovery of other network nodes on a local link. The protocol is insecure and susceptible to malicious interference. SEND provides an alternate mechanism for securing NDP with a cryptographic method that is independent of IPsec, the original and inherent method of securing IPv6 communications.

Current SEND protocols utilize cryptographically generated address (CGA) and authorization delegation discovery (ADD) to provide security. CGA uses an RSA key to generate a host address and signature and transmit a public key in the CGA option portion of a message. The CGA option is not available to hosts with existing addresses. THE ADD mechanism requires a trust anchor to authenticate the certificates of routers.

SUMMARY OF THE INVENTION

The present technology provides an extension to the SEND protocol without requiring a CGA or third party trust anchor. A shared key is provided to both a sender and receiver of a neighbor discovery (ND) message. A digital signature option is contained in the ND message. A digital signature field is determined by the algorithm field in the option. When the ND message is received, the receiver may verify the digital signature field using the pre-shared key according to the algorithm field. If the ND message passes verification, the receiver may process the message.

In an embodiment, a method for verifying an ND message may begin with receiving a neighbor discovery message from a first computer by a second computer. The neighbor discovery message may include an algorithm identifier and algorithm. The algorithm identifier and algorithm may be accessed from the neighbor discovery message. A verification of the received neighbor discovery message may be performed by the second computer based on the algorithm identifier, algorithm, and a key.

In an embodiment, an information handling system may include a processor, memory and one or more modules. The one or more modules may be stored in memory and executable by the processor to receive a neighbor discovery message from a first computer by a second computer, the neighbor discovery message including an algorithm identifier and algorithm, access the algorithm identifier and algorithm from the neighbor discovery message, and perform a verification of the received neighbor discovery message by the second computer based on the algorithm identifier, algorithm, and a key.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The present technology provides an extension to the SEND protocol without requiring a CGA or third party trust anchor. A shared key is provided to both a first computer (e.g., a sender) and a second computer (e.g., a receiver) of a neighbor discovery (ND) message. A digital signature option is contained in the ND message sent by a first computer. A digital signature field is determined by the algorithm field in the digital signature option. When the ND message is received, the receiver may verify the digital signature field using the pre-shared key according to the algorithm field. If the ND message passes verification, the receiver may process the message.

Figure 1:
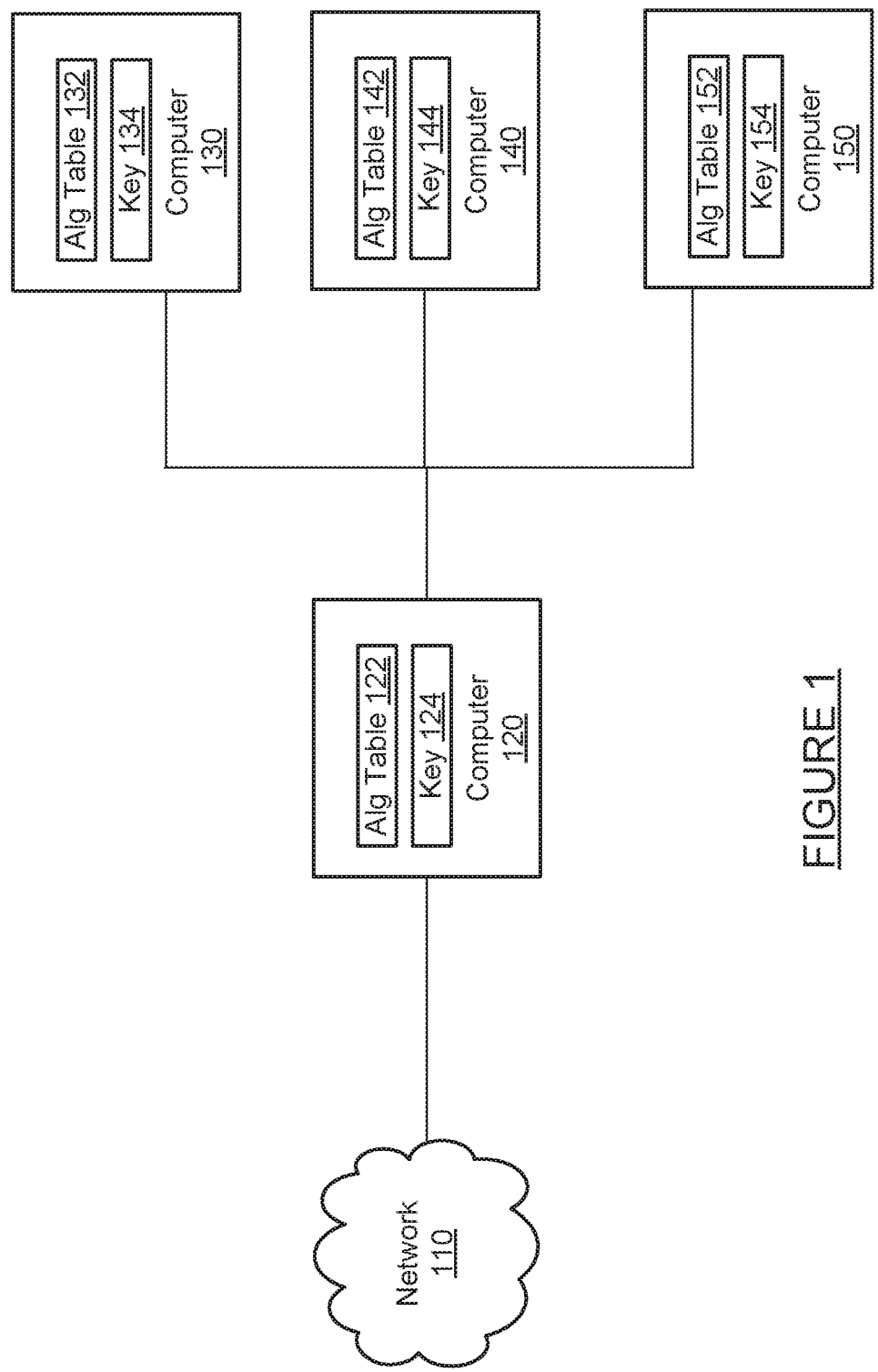
FIG. 1 depicts a block diagram of one embodiment of an information handling system capable of providing a secure SEND protocol message.

FIG. 1 depicts a block diagram of one embodiment of an information handling system for providing a secure SEND protocol message. The information handling system of FIG. 1 includes network 110, computer 120, and computers 130-150. Computer 120 is connected to network 110 and includes an algorithm table 122 and a key 124. Computer 120 may be implemented as a router or other device that provides a network connection between network 110 and computers 130-150.

Algorithm table 122 may provide values for an algorithm filed and corresponding digital signal field. The algorithm field value and digital signal field value may be placed into a neighbor discover (ND) message by computer 120 and accessed from the message by receiving computer 130, 140 or 150. An example of an algorithm table is discussed with respect to FIG. 2.

Computers 130-150 may receive an ND message transmitted by computer 120. The ND message may include an algorithm field and a digital signature field. The values for the algorithm field and a digital signature field should correspond to values in an algorithm table 132, 142, and 152 stored at computers 130-150, respectively. Each of computers 130-150 may receive an ND message from computer 120, perform a verification of the message based on the algorithm field value, a digital signature field value, and shared key, and determine whether the message is verified. If the message is verified, the message may be processed by the receiving computer. If the message is not verified, the message may be discarded. One or more modules stored on each of computers 130-150 and executed by a processor may access the algorithm field value and digital signature field, perform verification of the message, and perform other functionality as discussed herein.

Figure 2:
FIG. 2 depicts an algorithm table.

FIG. 2 depicts an algorithm table. The algorithm table may be stored in each of computers 120-150. The algorithm table includes algorithm field values and corresponding digital signature fields. Any number of the algorithm fields may be included in a digital signature option portion of an ND message. The digital signature field values specify different types of encryption that may be applied to the message. For example, algorithm field values of 0-7 correspond to digital signature field algorithms of MD5, SHA1, SHA256, SHA512, HMAC-MD5, HMAC-SHA1, HMAC-SHA256, and HMAC-SHA512.

Figure 3:
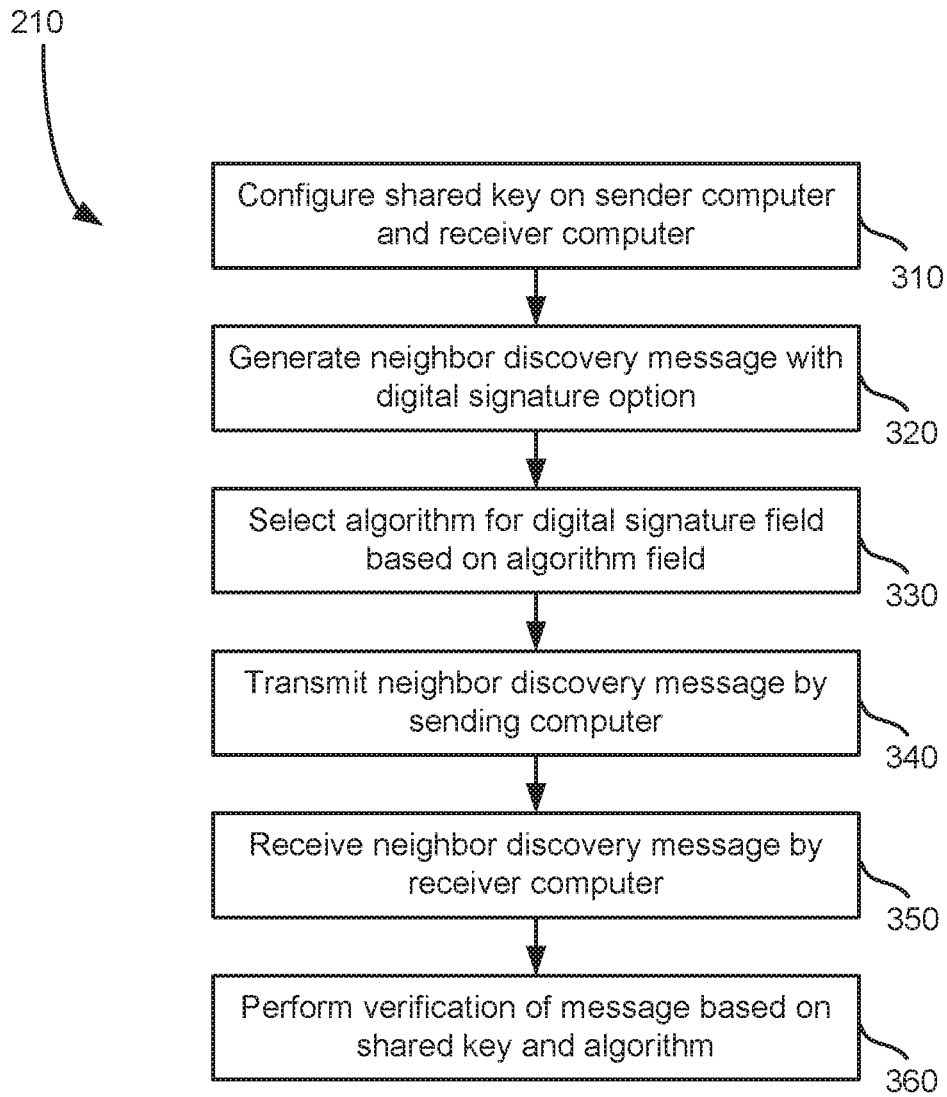
FIG. 3 depicts a flow diagram illustrating one embodiment of a method for providing a secure SEND protocol message.

FIG. 3 depicts a flow diagram, illustrating one embodiment of a method for providing a secure SEND protocol message. First, a shared key is configured on a sender computer and receiver computer at step 310. Configuring a shared key on a computer may include storing the shared key on the computer such that it can be used to encrypt or decrypt an ND message.

A neighbor discovery message is generated with a digital signature option at step 320. The digital signature option may be enabled by setting an algorithm field to a value that corresponds to a particular digital signature algorithm. The algorithm for the digital signature field is selected based on the algorithm field at step 330. Referring for example to the table of FIG. 2, if the algorithm field was set to 2, the digital signature field would be set to SHA256. The ND message with the digital signature option and digital signature field is transmitted from computer 120 to one of computers 130-150 at step 340.

The ND message is received at step 350. The message may be received by the first computer. At step 360, a verification is performed on the received ND message. The verification may be performed based on the shared key and the algorithm. More detail for performing verification is provided with respect to FIG. 4.

Figure 4:
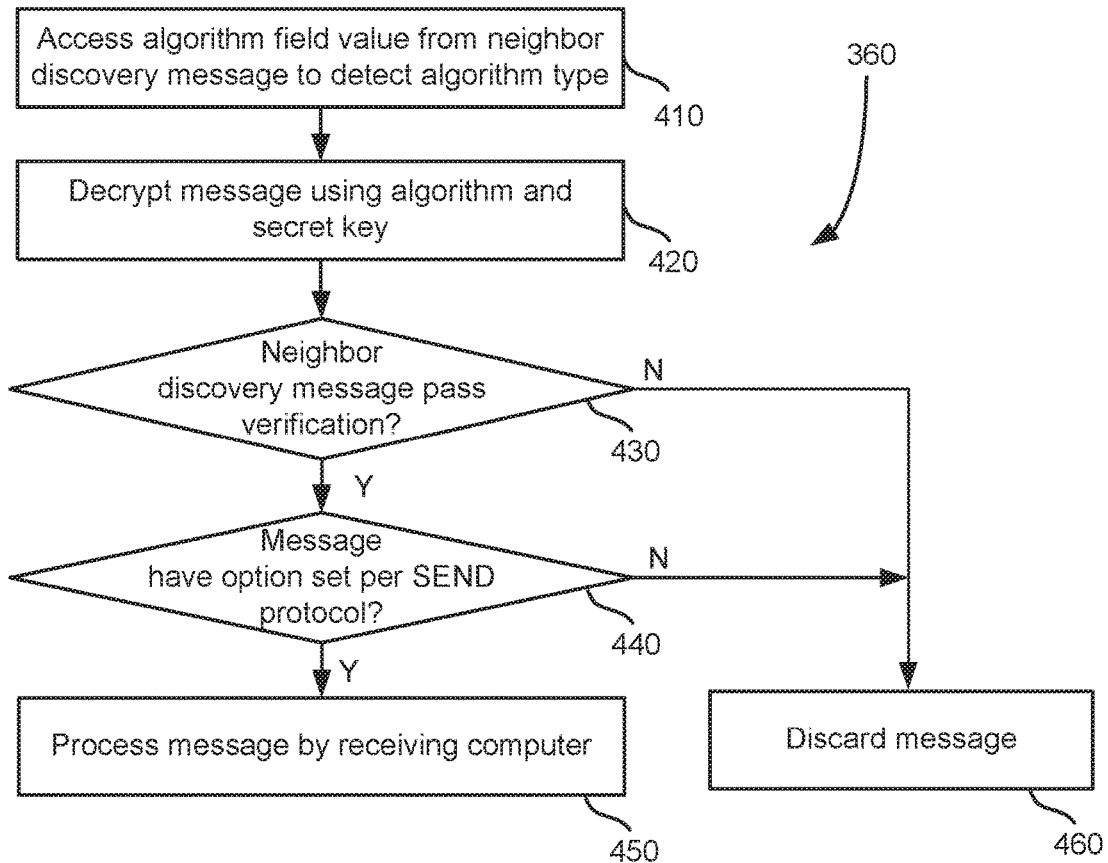
FIG. 4 depicts a flow diagram illustrating one embodiment of a method for performing verification of a message.

FIG. 4 depicts a flow diagram, illustrating one embodiment of a method for performing verification of a message. First, the algorithm field value is accessed from the ND message at step 410. The algorithm field value may be accessed to determine the corresponding algorithm type based on an algorithm table. The message is decrypted by applying the algorithm corresponding to the algorithm field value and the secret key at step 420. A determination is then made as to whether an ND message passes verification at step 430. If the message does not pass verification, the message is discarded at step 460. If the message does pass verification, a determination is made at step 440 as to whether the message has an option set for the standard SEND protocol at step 440. If an option for the standard SEND protocol is set, the message is discarded at step 460. If the option is not set at step 440, the message may be processed by the receiving computer at step 450.

In some instances, a receiving computer may be configured to verify certain types of ND messages, for example only all ND messages, only SEND-enabled messages, only digital signature option messages, or other messages. For example, a computer could be configured to verify only Router Advertisement (RA) messages and not to verify the other ND messages. Or, a computer could be configured to verify all types of ND messages, including Router Solicitation, Router Advertisement, Neighbor Solicitation, Neighbor Advertisements and Redirect message.

Figure 5:
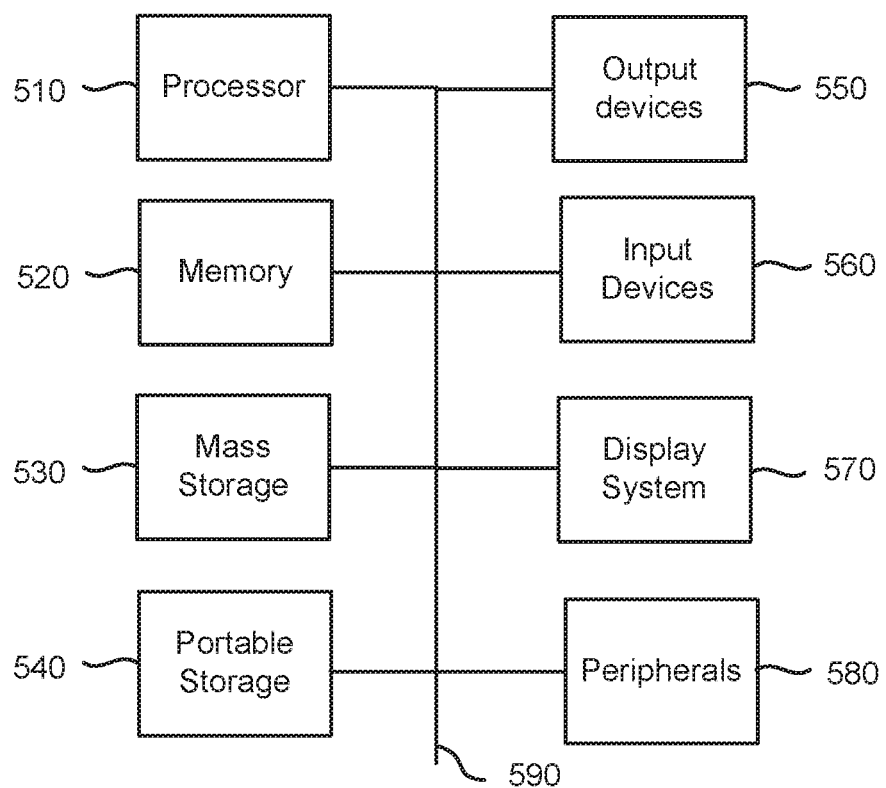
FIG. 5 depicts a block diagram of one embodiment of a device for implementing the present technology.

FIG. 5 depicts a block diagram of a device for implementing the present technology. System 500 of FIG. 5 may be implemented in the contexts of the likes of clients 110, 120, 130, 140 and 150. The computing system 500 of FIG. 5 includes one or more processors 510 and memory 520. Main memory 520 may store, in part, instructions and data for execution by processor 510. Main memory can store the executable code when in operation. The system 500 of FIG. 5 further includes a storage 520, which may include mass storage and portable storage, antenna 540, output devices 550, user input devices 560, a display system 570, and peripheral devices 580.

The components shown in FIG. 5 are depicted as being connected via a single bus 590. However, the components may be connected through one or more data transport means. For example, processor unit 510 and main memory 520 may be connected via a local microprocessor bus, and the storage 530, peripheral device(s) 580 and display system 570 may be connected via one or more input/output (I/O) buses.

Storage device 530, which may include mass storage implemented with a magnetic disk drive or an optical disk drive, may be a non-volatile storage device for storing data and instructions for use by processor unit 510. Storage device 530 can store the system software for implementing embodiments of the present invention for purposes of loading that software into main memory 510.

Portable storage device of storage 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 530.

The system 500 as shown in FIG. 5 includes output devices 550 and input device 560. Examples of suitable output devices include speakers, printers, network interfaces, and monitors. Input devices 560 may include a touch screen, microphone, accelerometers, a camera, and other device. Input devices 560 may include an alpha-numeric keypad, such as a keyboard, for inputting alpha-numeric and other information, or a pointing device, such as a mouse, a trackball, stylus, or cursor direction keys.

Display system 570 may include a liquid crystal display (LCD), LED display, or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computing system, such as but not limited to a desk top computer, lap top computer, notebook computer, net book computer, tablet computer, smart phone, personal data assistant (PDA), or other computer that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A system for discovering neighboring computers, the system comprising:
   a first computer comprising a first memory that:
      stores algorithm information that includes a plurality of algorithm identifier values, wherein each algorithm identifier value is associated with a different encryption type, and the stored algorithm information cross-references each algorithm identifier value with the associated encryption type, and
      stores a shared key corresponding to at least one of the plurality of algorithm identifier values;
   a second computer comprising:
      a second memory that:
         stores a copy of the algorithm information, wherein the copy of the stored algorithm information also cross-references each of the algorithm identifier values with the associated encryption type, and
      a network interface that:
         receives the shared key over a computer network, wherein the shared key is stored in the second memory, and
         sends a message to the first computer, wherein the message includes one of the algorithm identifier values;
   wherein a processor at the first computer executes instructions stored in the first memory to:
      identify that the received message was sent according to the secure neighbor discovery (SEND) protocol,
      identify an encryption type associated with the algorithm identifier value in the message based on the stored algorithm information, and
      verify the message after identifying that the received message was sent according to the SEND protocol, the verification based on the identified encryption algorithm type and the shared key.

2. The system of claim 1, wherein the algorithm information stored at the first memory and at the second memory correspond to a same set of information that cross-references each of the algorithm identifiers to the associated encryption type.

3. The system of claim 1, further comprising one or more other computers, each other computer storing a respective copy of the algorithm information for use in processing a neighbor discovery (ND) message.

4. The system of claim 3, wherein at least one of the other computers is configured to verify the ND message when the ND message corresponds to a router advertisement (RA) message.

5. The system of claim 3, wherein a corresponding shared key is stored at each of the other computers.

6. The system of claim 1, wherein the verification is performed only on messages received according to the SEND protocol.

7. A method for discovering neighboring computers, the method comprising:
   storing algorithm information at a first computer, wherein the stored algorithm information includes a plurality of algorithm identifier values, each algorithm identifier value is associated with a different encryption type, and the stored algorithm information cross-references each algorithm identifier value with the associated encryption type;
   storing a shared key at the first computer, the shared key corresponding to at least one of the plurality of algorithm identifier values, wherein the shared key is sent over a computer network to a second computer, the second computer stores a copy of the algorithm information, and the copy of the algorithm information stored at the second computer also cross-references each of the algorithm identifier values with the associated encryption type;

receiving a message sent from the second computer to the first computer, wherein the message includes one of the algorithm identifier values;

identifying that the received message was sent according to the secure neighbor discovery (SEND) protocol;

identifying an encryption type associated with the algorithm identifier value in the message based on the stored algorithm information; and verifying the message after identifying that the received message was sent according to the SEND protocol, wherein the verification is based on the identified encryption type and the shared key.

8. The method of claim 7, wherein the algorithm information stored at the first computer and at the second computer correspond to a same set of information that cross-references each of the algorithm identifier values with the associated encryption type.

9. The method of claim 7, wherein each of one or more other computers stores a respective copy of the algorithm information for use in processing a neighbor discovery (ND) message.

10. The method of claim 9, wherein at least one of the other computers is configured to verify the ND message when the ND message corresponds to a router advertisement (RA) message.

11. The method of claim 9, wherein a corresponding shared key is stored at each of the other computers.

12. The method of claim 7, wherein the verification is performed only on messages received according to the SEND protocol.

13. The method of claim 7, wherein verifying the message includes:

identifying an encryption type associated with the message based on the algorithm information associating the algorithm identifier value in the message with the associated encryption type;

decrypting at least part of the message based on the encryption type and the shard key; and identifying that the message is verified based on the decrypting part of the message.

14. A non-transitory computer-readable storage medium having embodied thereon a program executable by a processor for implementing a method for discovering neighboring computers, the method comprising:

storing algorithm information at a first computer, wherein the stored algorithm information includes a plurality of algorithm identifier values, each algorithm identifier value is associated with a different encryption type, and the stored algorithm information cross-references each algorithm identifier value with the associated encryption type;

storing a shared key at the first computer, the shared key corresponding to at least one of the plurality of algorithm identifier values, wherein the shared key is sent over a computer network to a second computer, the second computer stores a copy of the algorithm information, and the copy of the algorithm information stored at the second computer also cross-references each of the algorithm identifier values with the associated encryption type;

receiving a message sent from the second computer to the first computer, wherein the message includes one of the algorithm identifier values;

identifying that the received message was sent according to the secure neighbor discovery (SEND) protocol;

identifying an encryption algorithm type associated with the algorithm identifier value in the message based on the stored algorithm information; and verifying the message after identifying that the received message was sent according to the SEND protocol, wherein the verification is based on the identified encryption type and the shared key.

15. The non-transitory computer readable storage medium of claim 14, wherein the algorithm information stored at the first computer and at the second computer correspond to a same set of information that cross-references each of the algorithm identifier values with the associated encryption type.

16. The non-transitory computer-readable storage medium of claim 14, wherein each of one or more other computers stores the algorithm information for use in processing a neighbor discovery (ND) message.

17. The non-transitory computer-readable storage medium of claim 16, wherein at least one of the other computers is configured to verify the ND message when the ND message corresponds to a router advertisement (RA) message.

18. The non-transitory computer-readable storage medium of claim 16, wherein a corresponding shared key is stored at each of the other computers.

19. The non-transitory computer-readable storage medium of claim 14, wherein the verification is performed only on messages received according to the SEND protocol.

20. The non-transitory computer-readable storage medium of claim 14, wherein the program is also executable to verify the message includes instructions for:

identifying an encryption type associated with the message based on the algorithm information associating the algorithm identifier value in the message with the associated encryption type;

decrypting at least part of the message based on the encryption type and the shard key; and identifying that the message is verified based on the decrypting part of the message.

* * * * *